(12) United States Patent
Lee (10) Patent No.: US 9,517,399 B1
(45) Date of Patent: Dec. 13, 2016

(54) PORTABLE GOLF IMPACT PRACTICE MAT

(71) Applicant: Seung Won Lee, Tujunga, CA (US)

(72) Inventor: Seung Won Lee, Tujunga, CA (US)

(*) Notice: Subject to any disclaimer, the term of this patent is extended or adjusted under 35 U.S.C. 154(b) by 0 days.

(21) Appl. No.: 14/737,391

(22) Filed: Jun. 11, 2015

(51) Int. Cl.
*A63B 69/36* (2006.01)
*A63B 24/00* (2006.01)

(52) U.S. Cl.
CPC ....... *A63B 69/3661* (2013.01); *A63B 24/0003* (2013.01); *A63B 2208/0204* (2013.01); *A63B 2220/30* (2013.01)

(58) Field of Classification Search
USPC ................ 473/139, 140, 147, 148, 219–225, 278, 473/279
See application file for complete search history.

(56) References Cited

U.S. PATENT DOCUMENTS

| | | | | |
|---|---|---|---|---|
| 3,601,408 A | * | 8/1971 | Wright | A63B 69/36 473/225 |
| 3,936,055 A | * | 2/1976 | Scott | A63B 69/3652 206/315.1 |
| 4,254,956 A | * | 3/1981 | Rusnak | A63B 69/36 473/225 |
| 6,135,895 A | * | 10/2000 | Estivo | A63B 69/3652 473/261 |
| 6,227,984 B1 | * | 5/2001 | Blankenship | A63B 69/3614 473/221 |
| 7,704,154 B2 | * | 4/2010 | Loh | A63B 69/3614 473/148 |
| 2003/0054898 A1 | * | 3/2003 | Otten | A63B 69/3614 473/219 |

\* cited by examiner

*Primary Examiner* — Nini Legesse (57) ABSTRACT

The portable golf impact practice mat is a golf practice mat that provides visual indicators to inform of three extremely important impact conditions using a digital display, a signal generating unit and a plurality of LED (light emitting diode). One of them indicates the swing path in reference to how the golf club head moves toward the target. Another detects and indicates if the club head hits the golf mat in front of the ball also known as a "fat shot". Lastly, the third displays a club head speed upon impact. The present invention is designed to be used by attaching to the general golf practice mats widely found in public golf driving ranges or personal golf practice mats. The present invention is compact, folds in half and fits in one-hand providing portability.

20 Claims, 7 Drawing Sheets

PORTABLE GOLF IMPACT PRACTICE MAT

FIELD OF THE INVENTION

The present invention relates to a portable golf swing practice mat and, more particularly, to an attachable correct impact practice mat including three indicators to inform three impact conditions, indicating a path of the golf club head, indicating a detected fat shot and displaying a swing speed.

BACKGROUND OF THE INVENTION

The game of golf is to put a golf ball into a series of the hole cups, starting from certain points known as a "tee box" located on various distances. The player uses various golf clubs in as few strokes as possible, during the game. To achieve this goal and place the ball into a hole in as few strokes as possible, a longer and more accurate golf shot is extremely important. In fact, many amateur golfers are focusing on a swing technique for power rather than a swing technique of how to make a correct impact. For example, some teenage boys and girls who want to be professional golfers are hitting a ball farther and more accurate than general adult golfers do, even though they are physically weaker. This proves the point that it is more important for a swing technique focusing on correct impact rather than a swing technique of power. Without realizing this point, most amateur golfers are practicing a lot to improve their swings but it is not improve because they are still focus on the swing technique of hitting the ball more powerfully.

Many golfers have no idea what their swing flaws are, because they don't have any information about the moment of contact in when the club head meets the ball. Most would follow instructions from a golf teaching professional without fully understanding the reason behind it.

The opportunity to invent this apparatus was derived from the idea that if there was a device that could provide accurate indication during the golf ball impact of the golf swing, many golfers will improve the techniques efficiently in a short period of time. Golfers, who use the present invention, will improve their swing easily by receiving feedback of the golf swing immediately through the indicators. The present invention also will help augment any adjustments from golf teaching professionals in order to create the "perfect swing".

Figure 3A:
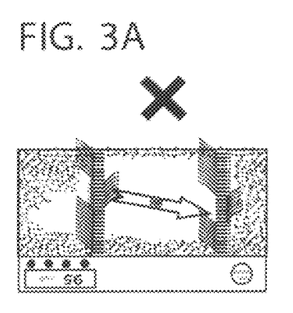
FIG. 3A is a top view showing incorrect impact. The golf club head makes an in-to-out path.
Figure 3B:
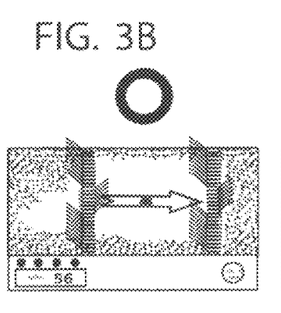
FIG. 3B is a top view showing one of the perfect impact conditions which the club head must hit the ball in a parallel direction to the target point.
Figure 4A:
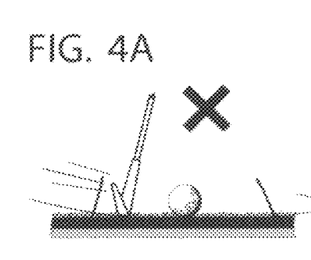
FIG. 4A is a side view showing incorrect impact. The golf club head hit the golf mat first.
Figure 4B:
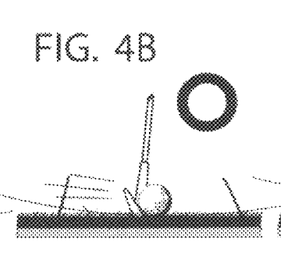
FIG. 4B is a side view showing one of the perfect impact conditions which the golf club head must hit the ball directly without contacting the golf mat, first.
Figure 4C:
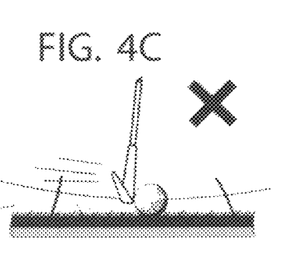
FIG. 4C is a side view showing incorrect impact. The golf club head makes a topping ball.
Figure 5A:
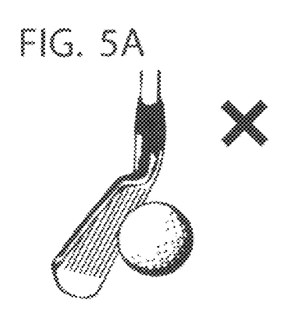
FIG. 5A is a top view showing incorrect impact. The golf club face is open.
Figure 5B:
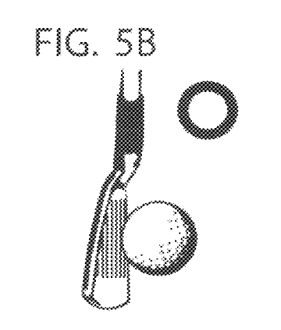
FIG. 5B is a top view showing one of the perfect impact conditions which the club face must contact with the ball at the right angle to the target direction.

According to science, there must be four conditions met to achieve the perfect impact on the golf swing:
First, the club head must hit the ball in a parallel direction to the target point. (refer to FIG. 3B)
Second, the club head must hit the ball directly without hitting the ground, first. (refer to FIG. 4B)
Third, the club face must contact with the ball at the right angle to the target direction. (refer to FIG. 5B)
Fourth, faster head speed will give a greater distance to the ball travel.
First, second and third are required conditions to achieve a perfect impact.
First, second, third and fourth are required conditions to send a ball more accurate and farther.

All golfers aspire to send a ball farther away or accurately to the desired distance and most golfers expend a lot of time and effort in developing a golf swing in order to obtain this result. But, it does not effectively improve, because most of them do not realize the fact that there are many difference between the imagined swing that they wanted to do and an actual performed swing.

The present invention has three indicators to inform the golfer of three extremely important impact conditions. One of them indicates a path of the golf club head as that how the golf club head moves toward the target. Another indicates if the club head hits the golf mat before contact with the ball. Lastly, a third displays the club head speed. These indicators will show user's swing conditions accurately and will provide direction to where they need to adjust, by disclosing flaws in their swing. This would especially help golfers who do not see improvements despite the countless hours they exert in practicing the golf swing. The present invention would be an absolute must for novice golfers as they can leverage this invention to learn the correct swing from the beginning. This invention was designed with portability in mind to provide a practical device that is simple to use and convenient.

DETAILED DESCRIPTION OF THE INVENTION

Some prior art were developed with a method of indicating the movement of golf club head using the mat made by special materials, but It was durable for prolonged use. Other prior art utilizes complicated apparatus and is only provided in specialized facilities. One prior art, in the case of video analyzer, which provides a way to calibrate and analyze a swing by reviewing the recorded information recorded with the video analyzer can provide similar results but it less effective because the swing can't be checked in real-time.

Figure 1:
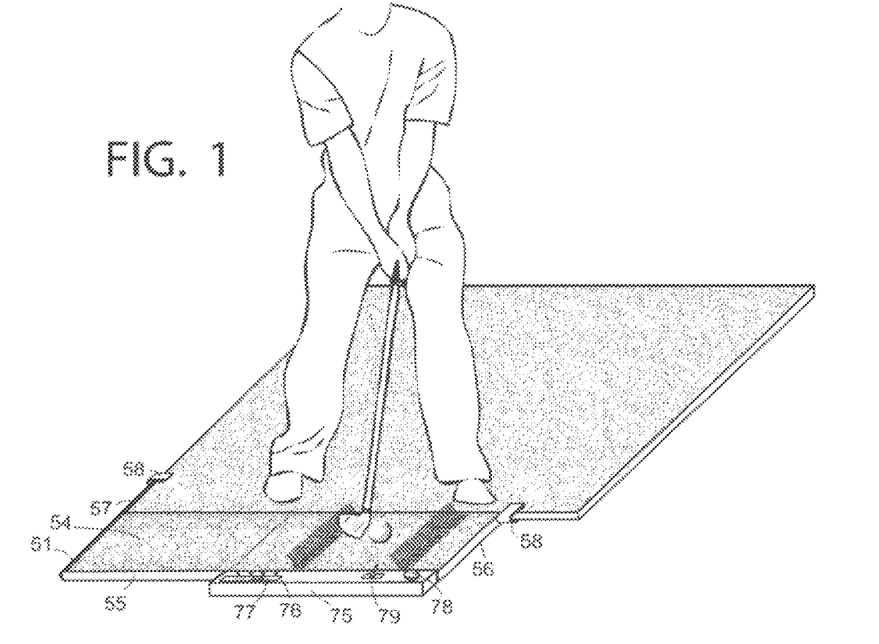
FIG. 1 is a perspective view of a golfer practicing by attaching the present invention to the general practice golf mat.
Figure 2:
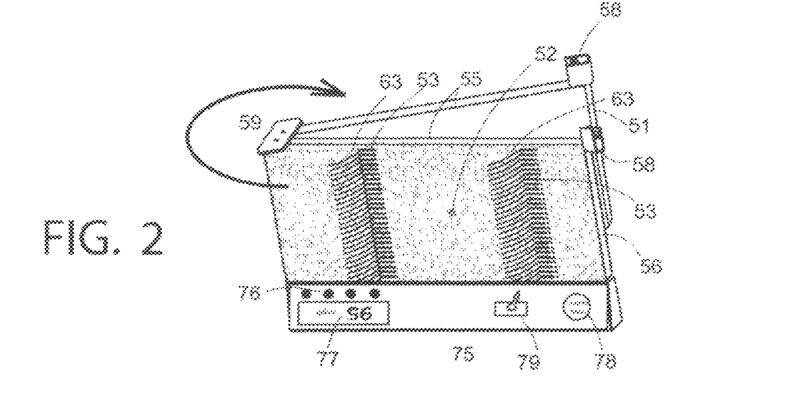
FIG. 2 is a perspective view of the folded shape of the present invention.

The present invention is made with similar material as the mats provided at the public golf driving range. Golfers will be find this invention familiar and will adjust to it quickly. This invention is designed to be used by attaching to the general golf practice mat or a private golf mat and is designed to fold in half so as to be easily carried with in hand. (refer to FIG. 1 and FIG. 2)

The portable golf impact practice mat, comprising:
1. A swing path sensor assembly having two equal sensor bar 60, the sensor bar 60 further comprises a series of the wire-activating switches 62 connected consecutively, one sensor bar 60 is disposed in front of the impact area 54-1 based on the target direction and the other is disposed behind, both are covered with the golf mat 54. A plurality of the detecting wires 63 are sticking out from inside of the wire-activating switches 62, which are major members of the swing path sensor assembly, toward the upper direction through a plurality of perforated holes 53 on the golf mat 54, in purpose of detecting a golf club head 71.
2. A fat shot sensor assembly 61 having at least two sensors 74 detect that the club head 71 hits the golf mat 54 in front of the ball known as a fat shot, are disposed around the impact area 51 and covered with the golf mat 54.
3. A head speed sensors detecting the speed of the club head 71 by the difference of the touching time between the front detecting wires 63 and the rear detecting wires 63, are disposed inside of the wire-activating switches 62.
4. A perforated golf mat 54 having a plurality of holes 53 for sticking out the detecting-wires 63 from the swing path sensor assembly and for emitting LED lights 64, formed an artificial turf like a general golf mat and is disposed upper of the impact area 54-1.
5. A spacer plate 56 aligning equal height with other side, is disposed bottom layer of other side of the impact area 54-1, and may be created as a container used for storage to put some handy tools and extra related parts.
6. A golf mat 54 forming an artificial turf like a general golf mat, is disposed above the spacer plate 56 at the other side of the impact area 54-1.
7. A pair of longer side frame members 55 supporting both of longer sides of the entire golf mat 54, 54-1 which shaped a long rectangular, is approximately the same height as the golf mat 54, and is made of a steel bar. Both are the bisected-frame members 55 which connected 59 to be able to fold in half, to make as a portable.
8. A pair of shorter side frame members 51, 56 having a sliding extension bar 57 each including a clamp 58 in purpose of attaching on a general golf mat, is approximately the same height as the golf mat 54, and is made of a thin steel bar.
9. A control box 75 having the club head 71 speed indicator 77, the fat shot indicator 76, a reset button 78, batteries, a secondary battery, power switch 79, circuit, some control switches and the like.

The two critical components in the game of golf are the swing and the moment of impact in a swing. The key features of the present invention is to indicate immediately and accurately three important impact conditions through the light emitting device and the digital display, and these devices are mounted inside the control box 75 and underneath the golf mat 54 around the impact area 54-1. Indicating the critical information about the swing, this invention will help improve the swing technique of many golfers.

Portability is another key feature of this invention. It was designed to be portable because every golfer should be able to use it easily. It would not be feasible for this invention to be the same size as the mats found in public/private driving ranges so this invention was designed to be folded in half. Even though it is smaller than the traditional golf mat, it retains similar attributes as a traditional golf mat. This invention retains similar material and similar height to a traditional mat. It is designed not to be a replacement to a traditional golf mat but rather an add-on device that attaches itself to a golf mat. The easy integration to a traditional mat will provide familiarity and an illusion that the invention is a part of the golf mat. The material for the invention is flexible and can be scale with any new material developed for golf mats.

The present invention is divided by the impact area side part and the other side part, by the folding part of the bisected-frame members 55. Most of the sensors are mounted in the bottom layer of the impact area side part. And the bottom layer of the other side part is a residual extra space, can use the space as a container to store some extra tools and related parts, by creating a box with the same height as the sensors height of the impact area part. The upper layer is conforms with same material as general golf mats that using at public golf driving ranges and the mats on the impact area side part have a plurality of perforated holes 53 for sticking out the detecting-wires 63 from the swing path sensor assembly, and have a plurality of perforated holes 53 for emitting LED lights 64. Especially, a plurality of holes 53 on the mat should be the elongated shape in order to do not affect the movement of the detecting-wires 63 because the detecting-wires 63 move to the target direction by hitting with the club head. The area around the perforated holes 53 should be strengthened because the holes 53 are too close to each other, and the frequently hitting area by the club. Thus, it needs to be reinforced this area with a very strong and flexible materials a kind of polyurethane or a stronger and soft similar materials.

A ball position 52 needs to be constant because it is related in determining the swing path. Thus, a rubber golf tee can be mounted in the middle of the impact area 54-1, or it needs to mark a ball position 52 in the center of the impact area 54-1. In particular, since the golf mat 54 of the impact area 54-1 is easy to be worn out, should be designed to be able to replace easily using the Velcro. The sensor assemblies that needed to analyze a golf impact conditions using the present invention are the swing path sensor assembly and the fat shot sensor assembly 61. The swing path sensor assembly also has a function of detecting a golf club head speed.

Figure 8:
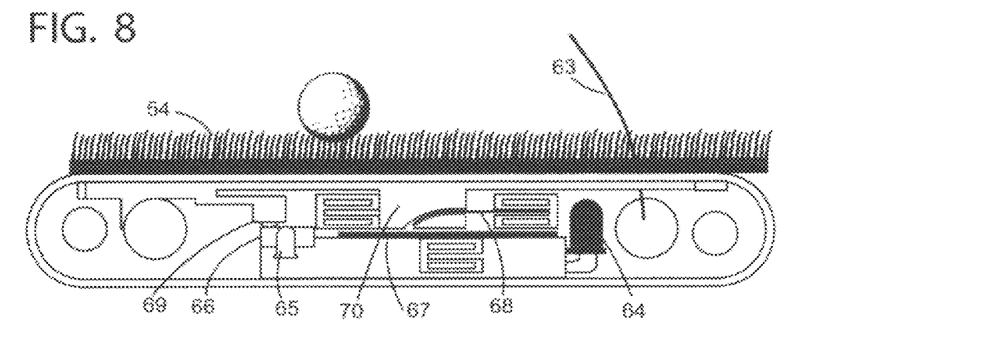
FIG. 8 is a fragmentary side view for explaining that the wire-activating switch is activated when the golf club head hit the detecting-wire, and it is showing inside the wire-activating switch with the detecting wire which is sticking out the golf mat.
Figure 8A:
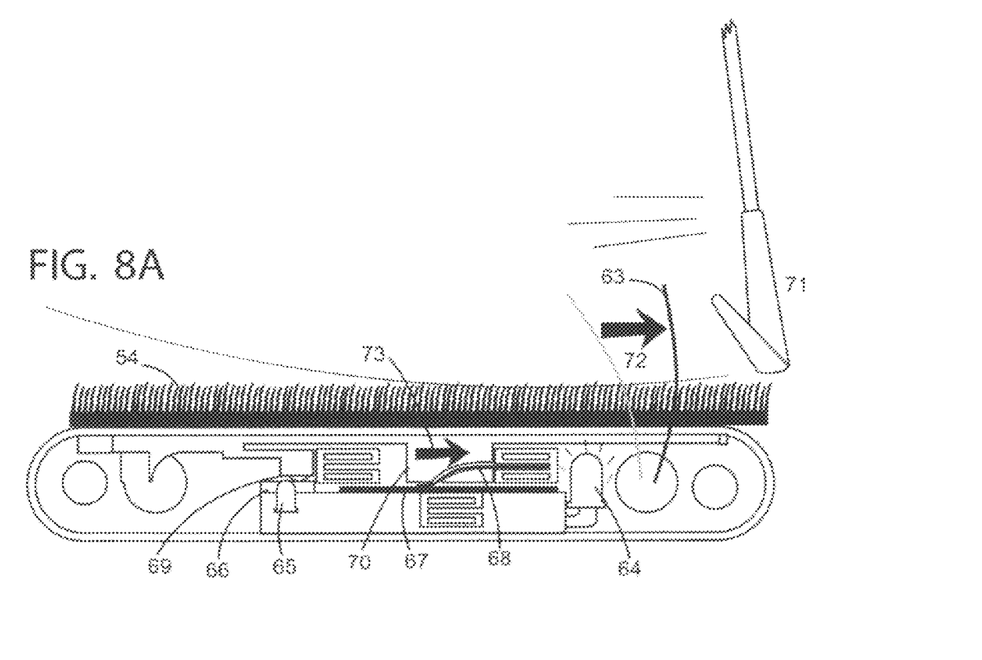
FIG. 8A is a fragmentary side view to explain a process that the LED light is emitted when the golf club head is hitting the detecting wire, and it is showing a movement of the flexible terminal.
Figure 9:
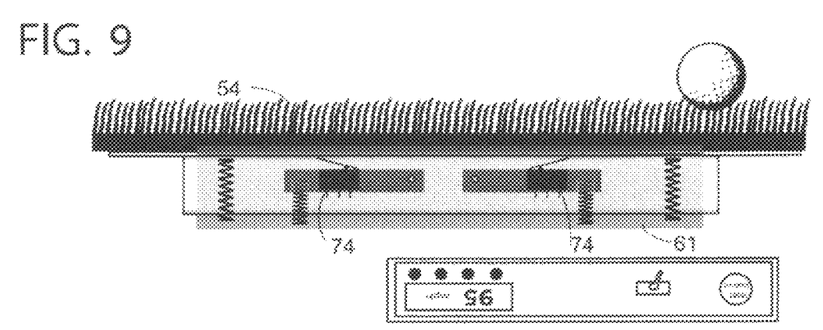
FIG. 9 is a fragmentary side view for explaining a process that the fat shot sensor assembly is detecting when the golf club head hits the golf mat in front of the ball and it is showing inside of the fat shot sensor assembly with two limit switches.
Figure 9A:
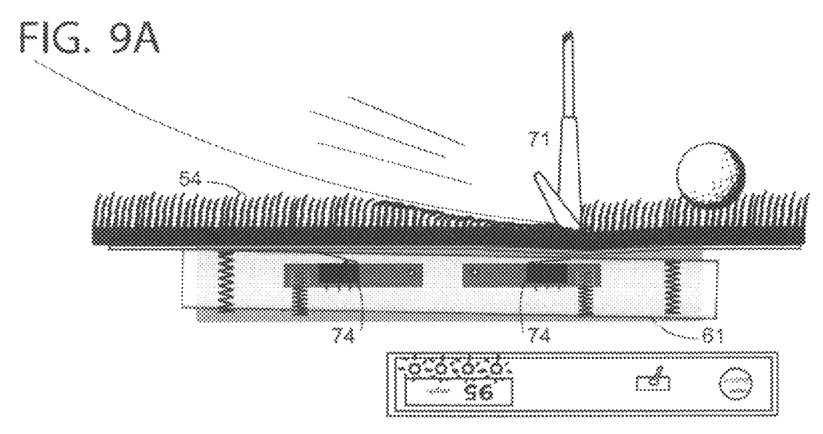
FIG. 9A is a fragmentary side view showing that the limit switches in the fat shot sensor assembly are activating when the golf club head is hitting the golf mat in front of the ball and the lights on the control box are emitting.
Figure 9B:
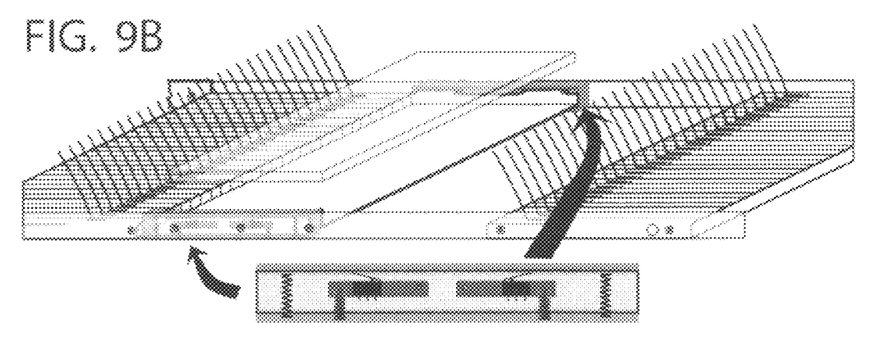
FIG. 9B is a perspective view, showing where the fat shot sensor assemblies is located.
Figure 10:
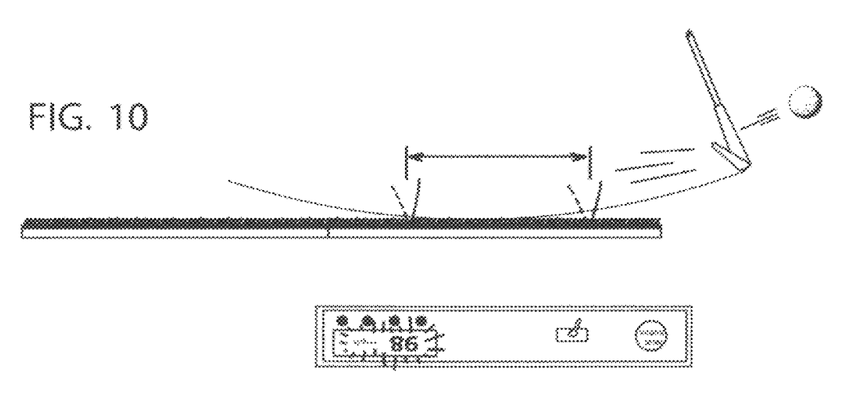
FIG. 10 is a side view showing a process of measuring a speed of the golf club head and indicating it. It measures accurately the speed of the club head by difference of the touching time between the front detecting-wires and the rear detecting-wires.
Figure 11:
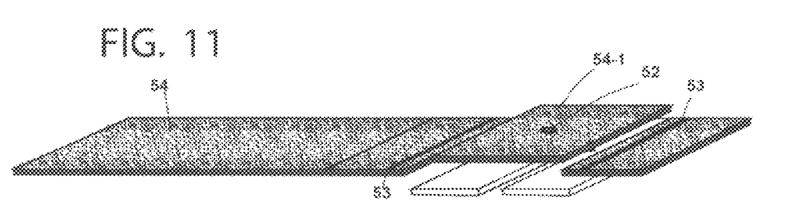
FIG. 11 is a schematic drawing to illustrate the structure of the present invention and the location of all parts.
Figure 11A:
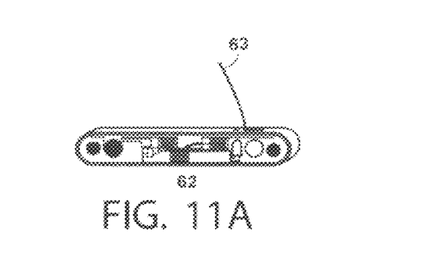
FIG. 11A is a perspective view of the wire-activating switch.
Figure 11B:
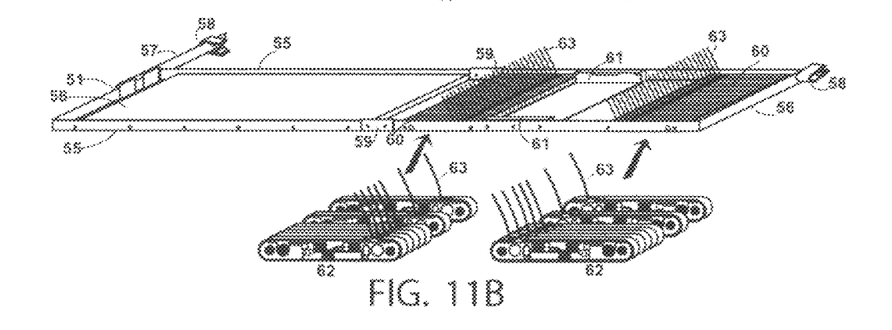
FIG. 11B is a perspective view showing a process of forming a sensor bar by connecting the wire-activating switches consecutively.

FIG. 11A is a perspective view showing the structure of the wire-activating switch 62. The wire-activating switch 62 is the primary sensor of the present invention. A LED (light emitting diode) 64 and a resistor which are light emitting elements are mounted inside of the wire-activating switch 62 and it will emit the light when the detecting-wire 63 is activated by hitting with the club head 71. The detecting-wire 63 is connected from inside of the wire-activating switch 62 toward to upper direction, and sticking out through a perforated hole 53 on the golf mat 54. It is moved 72 to the target direction by hitting it with the club head 71 and it is activated a swing path signal lights, and measure the club head speed. When the club head 71 hits the detecting-wire 63 strongly by the swing, it carried out two different switching operations by moving to the direction of the club path at the same time. The first switching operation of the wire-activating switch 62 is as shown in the FIG. 8, FIG. 8A, when the club head 71 hits the detecting-wires 63, the detecting-wire 63 is moved to the target direction, the sliding-parts 70 is moved along the detecting-wires 63, and a thin flexible terminal 68 is connected with the bottom terminal 67 through the thin curved passage of the sliding parts 70, and the LED light 64 emit by contact. The flexible terminal 68 and the bottom terminal 67 should be used a high electrical conductivity metals which can be go through the electricity very well, like a copper or a brass because it has a weak contact by structural characteristics of this switch. Especially, the thin flexible-terminal 68 should be moved smoothly along the thin curved passage of the sliding parts 70, so it should be used very good resilience and electrical conductivity metals.

The sensor bar 60 comprises a series of the wire-activating switches 62 connected consecutively, and a pair of the sensor bars 60 composes a swing path sensor assembly, will indicate the path of the club head 71. One sensor bar 60 is disposed in front of the impact area 54-1 based on the target direction and the other is disposed behind the impact area 54-1, both are covered with the golf mat 54. The detecting-wires 63 are sticking out from the inside of the wire-activating switches 62 toward to upper direction through a plurality of perforated holes 53 on the golf mat, will detects a golf club head 71. As a golfer performs his/her swing, the club head hits the detecting-wires 63 from the front sensor bar 60, the ball, and then the detecting-wires 63 from the rear sensor bar 60. By hitting the detecting-wires 63 with the club head 71 during the swing, the corresponding LED lights 64 are emitted, and the front and rear emitted LED lights 64 show the club head 71 movements accurately.

Figure 3C:
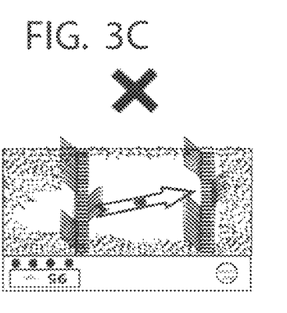
FIG. 3C is a top view showing incorrect impact. The golf club head makes an out-to-in path.

In order to create a perfect impact that I mentioned earlier, the club head 71 must be traveled in a parallel direction to the target point. (FIG. 3B) If the club head 71 makes an out-to-in path (FIG. 3A), or in-to-out path, (FIG. 3C), it will make a spin a ball and the ball flight will be fade/slice or draw/hook respectively. And it tends to lose distance if the ball is not hit in a parallel to the target point.

The other switching operation of the wire-activating switch 62 is to measure the club head speed. It measures accurately the speed of the club head 71 by the difference of the touching time between the front sensor bar 60 and the rear sensor bar 60. Obviously, the faster club head moves, further the ball flies. The first shot from the tee box is very important, and it will be advantageous to send a ball accurate and farther. Although the wire-activating switches 62 are fully protected underneath the golf mat, these are located in around a frequently hitting area. Therefore, the wire-activating switch 62 should be made of the material that is sturdy, abrasion durable and withstanding from hitting hard. Also, the detecting-wires 63 connected from the wire-activating switches 62 are hit frequently and strongly by the golf club. Thus, they should make of a very strong and a good elasticity/soft material such as a fishing wire and should designed to replace easily in case of broken.

Lastly, the fat shot sensor assembly 61 that detects a fat shot, is located underneath the golf mat around the impact area 54-1. It will activate the signal generating unit by the sensors 74 in the fat shot sensor assembly 61, if the club head 71 hits the golf mat 54 before it makes contact with the ball known as a fat shot.

The signal generating unit includes a speaker for generating a sound signal, the notification lamp 76 for generating a light signal using light. The signal generating unit is provided with both the notification lamp 76 and the speaker or may be provided with either one of the notification lamp 76 and the speaker. This fat shot sensor assembly 61 is required a device that allows to adjust the sensing intensity of the sensors 74. Considering the rough area, It must be designed not to be affected, even if hit very strongly by a club head 71 or accidentally stepping on. The goal here is to hit the ball first before the club head hits the golf mat. Therefore, one should practice not to generate this notification lamp 74. A fat shot greatly reduces the speed of the club, which reduces the speed of the ball and in turn decreases the distance the ball will travel.

Figure 5C:
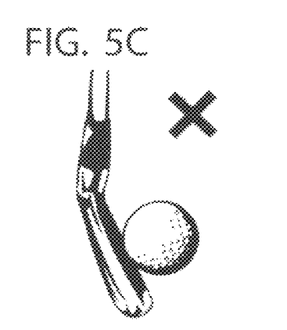
FIG. 5C is a top view showing incorrect impact. The golf club face is closed.
Figure 6:
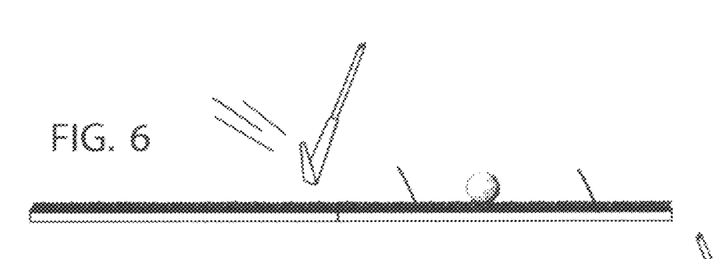
FIG. 6 is a side view for explaining a process in which the wire-activating switch is activated when the golf club head hit the detecting-wire, and it is showing a state before the detecting-wire is activated.
Figure 6A:
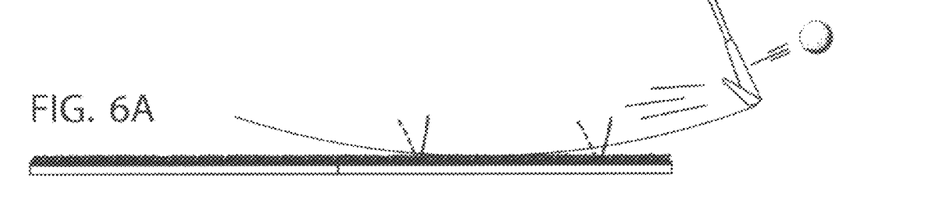
FIG. 6A is a side view showing a state that the detecting-wire is activated by the golf club head passed through the impact area.
Figure 7:
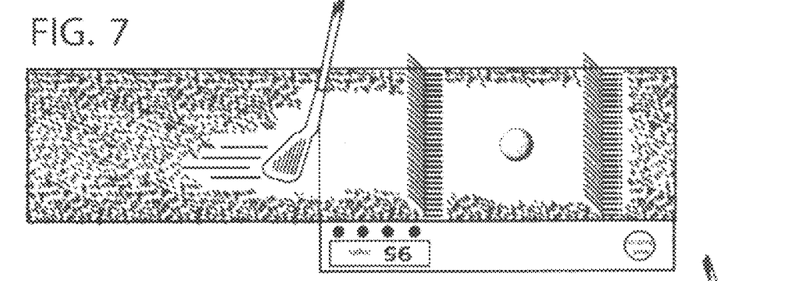
FIG. 7 is a top view for explaining a process in which the wire-activating switch is activated when the golf club head hit the detecting-wire, and it is showing a state before the detecting-wire is activated.
Figure 7A:
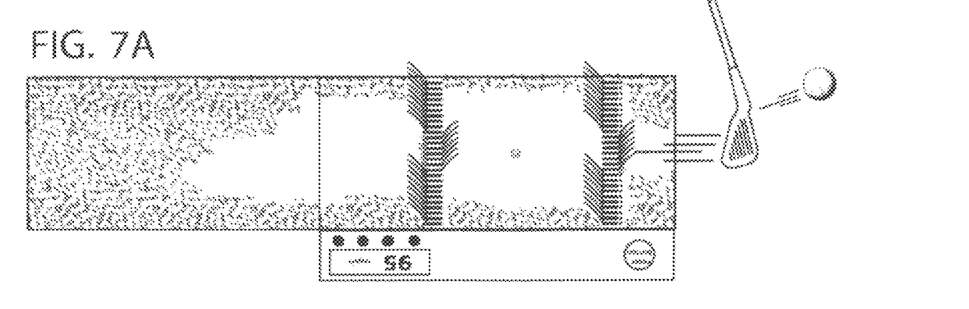
FIG. 7A is a top view showing a process that the LED lights are emitting after the club head passed through the swing path sensor assembly and these are indicating the swing path accurately by emitted lights from front sensor bar and rear sensor bar.

The present invention thus shows the swing path, club head speed, and fat impact condition at the same time. One can self-analyze his/her swing, and therefore modify the swing immediately, and can be improved the swing much quickly and accurately, by repeating. Another thing that must be executed to achieve a perfect impact is that the club face must contact the ball at the right angle to the target point. (refer to FIG. 5) And it should find a golfer's grip by changing the grip by itself to make the club face at a right angle. It is also an extremely important point. Besides these, it can be reset simply by pushing the reset button 78, or by auto reset function that automatically reset under specific conditions set by the golfer for his/her convenience.

The battery and a power source such as a secondary battery is built in the control box 75, and for the apparatus used in the indoor golf driving range is preferably formed to be connected with a separate adapter.

In conclusion, with respect to the above description, it is to be understood that the optimal dimensional specifications for the parts of the invention, including variations in number, size, shape, form, placement, material and the method of fabrication and assembly are deemed readily apparent to persons skilled in the art upon a reading of the foregoing description, and all equivalent specifications to those illustrated in the drawings and detailed in the description are intended to be encompassed by the present invention. Furthermore, it will be obvious to those skilled in the art that various modifications and revisions can be made to the embodiment shown herein without departing from the spirit and essential characteristics of the invention. It is therefore intended by the appended claims to cover any and all such modifications and revisions within the scope of the present invention.

I claim:

1. A portable golf impact practice mat, comprising:
    an impact area for placing a golf ball to be hit;
    a first sensor bar and a second sensor bar for detecting swing path and swing speed of a golf club head that is hitting the golf ball, where the first sensor bar and the second sensor bar are placed on or close to two sides of the impact area and is configured in a way that when a golf ball and pass the second sensor bar in sequence;
    at least one pressure sensor is placed beneath the impact area for detecting whether a fat shot occurred;
    a control box that connects to the first sensor bar, the second sensor bar and the at least one pressure sensor, where the control box calculates and displays the swing speed of the golf club head and indicates whether a fat shot occurred; and
    wherein the impact area further comprises plurality of perforated holes with LED lights that identifies the swing path of the golf club head.

2. The portable golf impact practice mat according to claim 1, wherein the first sensor bar and the second sensor bar are parallel to each other and each comprises a series of wire-activating switches connected consecutively in a line, and each wire-activating switch has a wire that extends above the impact area.

3. The portable golf impact practice mat according to claim 2, wherein the wire activates the wire-activating switch when the wire is contacted by the golf club head.

4. The portable golf impact practice mat according to claim 3, wherein the swing path of the golf club head is detected based on the activation of wire-activating switch or switches on the first sensor bar and the second sensor bar.

5. The portable golf impact practice mat according to claim 3, wherein each wire-activating switch is coupled with a LED light that emits light through on of the plurality of perforated holes when the wire-activating switch is being activated.

6. The portable golf impact practice mat according to claim 1, wherein the control box further comprises a speed indicator, a fat shot indicator, a power switch and a reset button.

7. The portable golf impact practice mat according to claim 1, wherein the first sensor bar, the second sensor bar, the at least one pressure sensor and the control box are powered by batteries in the control box or through a separate adapter.

8. The portable golf impact practice mat according to claim 1, further comprises at least one clamp for clamping the portable golf impact practice mat to another golf mat.

9. The portable golf impact practice mat according to claim 3, wherein the swing speed of a golf club head is calculated based on a distance between the first sensor bar and the second sensor bar, and based on a time between activation of wire-activating switch or switches on the first sensor bar and the activation of wire-activating switch or switches on the second sensor bar.

10. A portable golf impact practice mat, comprising:
    an impact area for placing a golf ball to be hit;
    a first sensor bar and a second sensor bar for detecting swing path and swing speed of a golf club head that is hitting the golf ball, where the first sensor bar and the second sensor bar are placed on or close to two sides of the impact area and is configured in a way that when a golf club swings at the golf ball, the golf club head will pass the first sensor bar, pass or hit the golf ball and pass the second sensor bar in sequence;
    wherein the first sensor bar and the second sensor bar are parallel to each other and each comprises a series of wire-activating switches connected consecutively in a line, and each wire-activating switch is coupled to a LED light and has a wire that extends above the impact area,
    wherein each wire-activating switch is activated when its wire is in contact with the golf club head and its LED light will emit light through a perforated hole on the impact area;
    wherein the swing path of the golf club head is identified by LED lights based on which wire-activating switches are being activated in the first sensor bar and the second sensor bar;
    at least one pressure sensor is placed beneath the impact area for detecting whether a fat shot occurred; and
    a control box that connects to the first sensor bar, the second sensor bar and the at least one pressure sensor, where the control box calculates and displays the swing speed of the golf club head through a speed indicator and indicates whether a fat shot occurred through a fat shot indicator.

11. The portable golf impact practice mat according to claim 10, wherein the control box further comprises a power switch and a reset button.

12. The portable golf impact practice mat according to claim 10, wherein the first sensor bar, the second sensor bar, the at least one pressure sensor and the control box are powered by batteries in the control box.

13. The portable golf impact practice mat according to claim 10, further comprises at least one clamp for clamping the portable golf impact practice mat to another golf mat.

14. The portable golf impact practice mat according to claim 10, wherein the swing speed of a golf club head is calculated based on a distance between the first sensor bar and the second sensor bar, and based on a time between activation of wire-activating switch or switches on the first sensor bar and the activation of wire-activating switch or switches on the second sensor bar.

15. The portable golf impact practice mat according to claim 10, further comprises a foldable golf mat that connects to the impact area through a hinge and is configured in a way that the foldable golf mat can be folded to the impact area or unfolded from the impact area.

16. A portable golf impact practice mat, comprising:
    an impact area for placing a golf ball to be hit;
    a first sensor bar and a second sensor bar for detecting swing path and swing speed of a golf club head that is hitting the golf ball, where the first sensor bar and the second sensor bar are placed on two sides of the impact area and is configured in a way that when a golf club swings at the golf ball, the golf club head will pass the first sensor bar, pass or hit the golf ball and pass the second sensor bar in sequence;

wherein the first sensor bar and the second sensor bar are parallel to each other and each comprises a series of wire-activating switches connected consecutively in a line, and each wire-activating switch is coupled to a LED light and has a wire that extends above the impact area;

wherein each wire-activating switch is activated when its wire is in contact with the golf club head and its LED light will emit light through a perforated hole on the impact area;

wherein the swing path of the golf club head is identified by LED lights based on which wire-activating switches are being activated in the first sensor bar and the second sensor bar;

at least one pressure sensor is placed beneath the impact area for detecting whether a fat shot occurred;

a control box that calculates and displays the swing speed of the golf club head and indicates whether a fat shot occurred; and a foldable golf mat that connects to the impact area through a hinge and is configured in a way that the foldable golf mat can be folded to the impact area or unfolded from the impact area.

17. The portable golf impact practice mat according to claim 16, wherein the control box further comprises a power switch and a reset button.

18. The portable golf impact practice mat according to claim 16, wherein the first sensor bar, the second sensor bar, the at least one pressure sensor and the control box are powered by batteries in the control box.

19. The portable golf impact practice mat according to claim 16, further comprises at least one clamp for clamping the portable golf impact practice mat to a general golf mat.

20. The portable golf impact practice mat according to claim 16, wherein the swing speed of a golf club head is calculated based on a distance between the first sensor bar and the second sensor bar, and based on a time between activation of wire-activating switch or switches on the first sensor bar and the activation of wire-activating switch or switches on the second sensor bar.

* * * * *